No. 707,161. Patented Aug. 19, 1902.
J. C. SALA.
SURVEYING AND RECONNAISSANCE INSTRUMENT.
(Application filed May 20, 1902.)
(No Model.) 2 Sheets—Sheet 1.
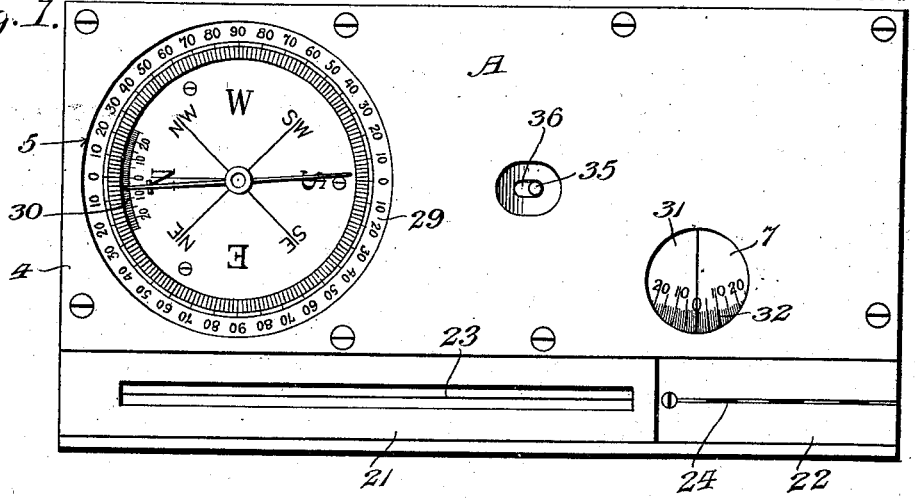
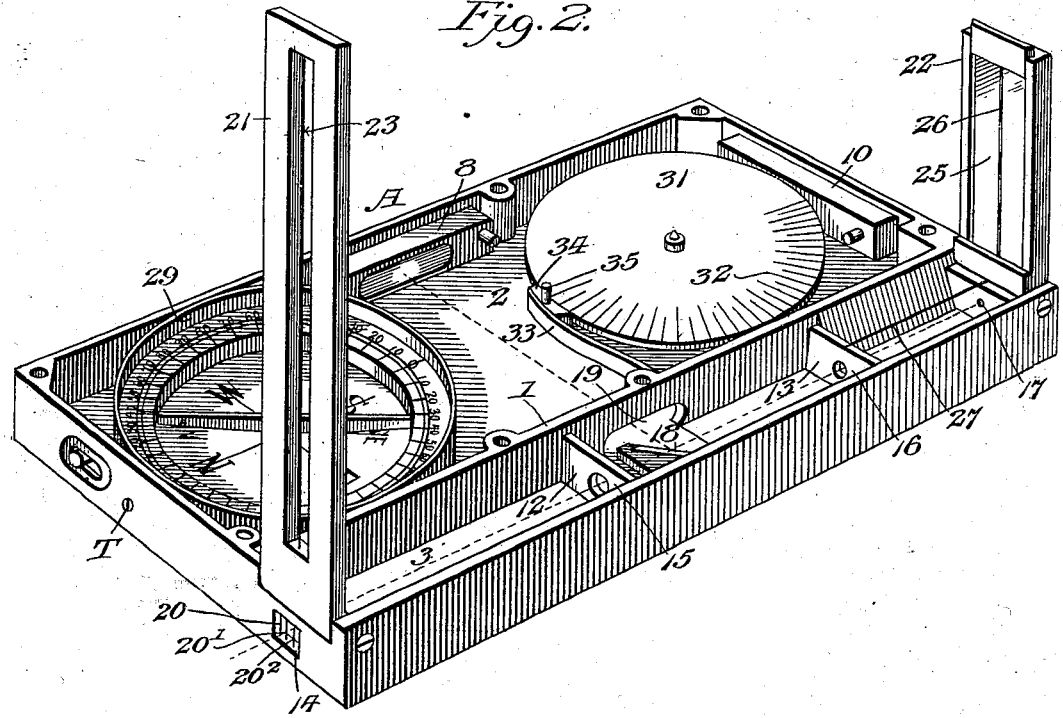
Joseph C. Sala, Inventor
Witnesses
Edwin G. McKee
A. G. Heysman
By Victor J. Evans
Attorney
THE NORRIS PETERS CO., PHOTO-LITHO., WASHINGTON, D. C.

No. 707,161. Patented Aug. 19, 1902.
J. C. SALA.
SURVEYING AND RECONNAISSANCE INSTRUMENT.
(Application filed May 20, 1902.)
(No Model.) 2 Sheets—Sheet 2.
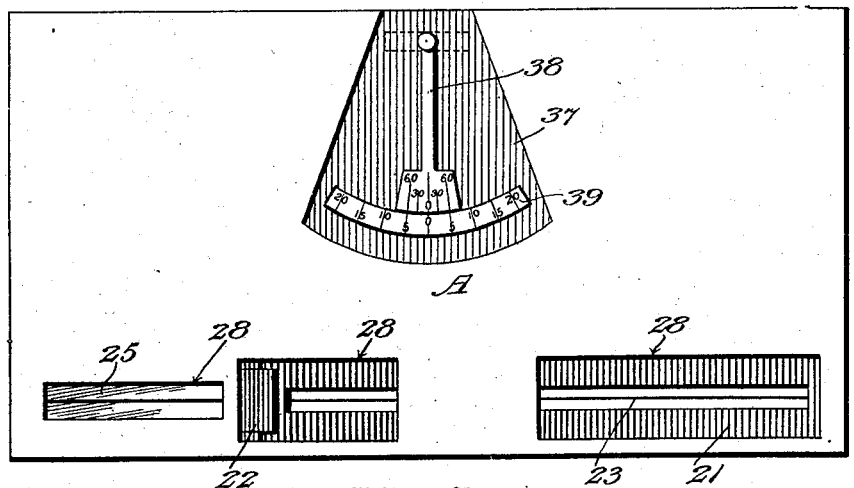
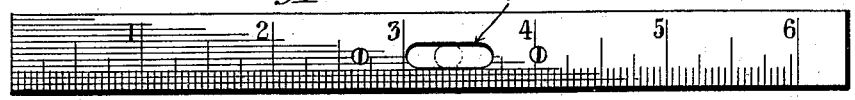
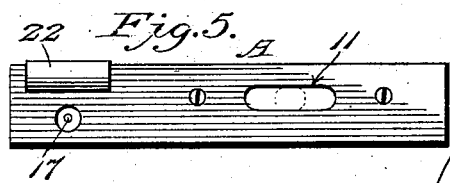
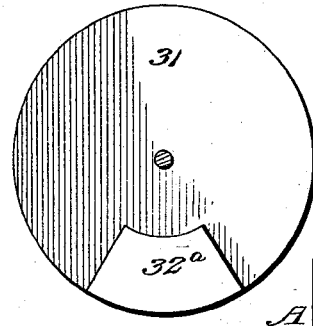
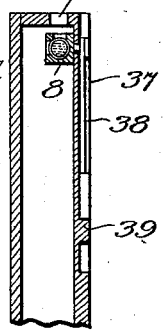
Inventor
Joseph C. Sala
Witnesses
Edwin McKee
A. G. Heylmun
By Victor J. Evans
Attorney

UNITED STATES PATENT OFFICE.

JOSEPH C. SALA, OF SAN FRANCISCO, CALIFORNIA.

SURVEYING AND RECONNAISSANCE INSTRUMENT.

SPECIFICATION forming part of Letters Patent No. 707,161, dated August 19, 1902.

Application filed May 20, 1902. Serial No. 108,239. (No model.)

*To all whom it may concern:*

Be it known that I, JOSEPH C. SALA, a citizen of the United States, residing at San Francisco, in the county of San Francisco and State of California, have invented certain new and useful Improvements in Surveying and Reconnaissance Instruments, of which the following is a specification.

My invention has relation to improvements in surveying and reconnaissance instruments; and the objects are, first, to aggroup in a single instrument the parts and elements requisite for ascertaining levels, altitudes, inclinations, distances, and direction; second, to put in the possession of civil and mining engineers or other persons an instrument of the kind named and for the purposes intended embodied in a compact form whereby the operator is enabled to ascertain levels or verticals, determine horizontal and vertical angles, and readily and conveniently without assistance record true bearings and inclinations—in fact, to make with this instrument all observations essential and arising in preliminary surveys, and especially in expert examination of mines. No tripod or other support is necessary in operating the instrument.

I am aware that there are instruments in the art to which my invention pertains, known as the "prismatic compass" and the "pocket-transit," which are utilized for the purpose of ascertaining magnetic bearings and vertical angles. So far as I am aware, however, the prismatic compass is the only hand instrument in the prior art permitting simultaneously sighting and recording of horizontal angles; yet that instrument will permit reading of angles lying but a few degrees above or below the level line. In the pocket-transit instrument horizontal angles cannot be simultaneously sighted and read. However, the operator can at the same time read and sight when observing vertical angles, although the field included is so limited that it is only practicable when the point to be sighted is a luminous one, as a candle in a tunnel or shaft.

In perfecting my invention I have sought to obviate the limitations of the foregoing-described well-known instruments and have added to and extended the utility, so that true bearings can be taken, and the variations east or west can be set off to one-quarter of a degree, thus obviating the necessity of adding or deducting the variation to or from the magnetic (north) bearing, and the magnetic needle can be held fixed by a locking device of particular construction.

With the foregoing objects in view the invention consists in the novel construction of parts and their arrangement and aggroupment in operative combination, as will be hereinafter fully described and particularly pointed out and distinctly claimed.

I have fully and clearly illustrated my improvements in the accompanying drawings, forming a part of this specification, and wherein—

Figure 1 is a top plan view of the instrument case or box, showing the compass and the sight-holes of the clinometer and gravitating disk and the sight-standards being turned down. Fig. 2 is a perspective view of the case or box, showing the relative arrangement and position of the parts and the sight-standards turned to vertical position. Fig. 3 is a plan view of the bottom of the casing, showing the quadrant-recess wherein the vernier is hung and also showing the limb, also showing the slots with sight-threads. Fig. 4 is a side edge view of the case, showing the graduated scale and peep-hole to the spirit-level. Fig. 5 is an end view of the case, showing the peep-hole through which observation may be had of the spirit-level located within the case at the end. Fig. 6 is an enlarged plan view of the clinometer-disk. Fig. 7 is a rear view of the clinometer-disk, showing the gravitating weight fixed thereto. Fig. 8 is a detail view of the reflecting spirit-level and vernier-arm connected together.

Referring to the drawings, A designates the case or box, made of such dimensions and capacity as to provide room for the elements mounted and operatively arranged therein. The case is composed of some suitable nonconducting metal and is usually made about six and one-half inches in length and three and a half inches wide and three-fourths of an inch in depth, the whole being planed absolutely true and squared. In the case is arranged a rigidly-fixed partition 1, extending the length of the case and for the depth thereof. This partition divides the case into two compartments, a larger one 2 and a smaller one 3. A cover 4 is provided to close the larger compartment and is made of the same material as that composing the box generally. In the cover 4 is a circular opening 5, wherein is secured the glass 6, covering the compass-box, and also having a reading-glass 7, through which the designations of the clinometer may be ascertained. In the long side of the case opposite to the smaller compartment, adjacent to the inner face thereof, is mounted a spirit-level 8, the position of the bubble being observable through an elongated slot 9, made through the side of the casing. This appliance is mounted on the pivot-pin of the vernier and is utilized when the instrument is used as a level. By laying the case on a surface on the side opposite to the spirit-level the position of the bulb will indicate the condition of horizontality. The spirit-level also acts in the same manner when the vernier is brought into requisition. In the end of the casing farthest from the compass is secured a spirit-level 10, the position of the bubble being visible through a slot 11 in the end of the casing. This appliance is useful when the instrument is used as a plumb.

In the smaller chamber or compartment 3 are arranged and secured two transversely-disposed partitions 12 13, which brace and sustain the outer wall or side of the casing and divide the compartment into three chambers or apartments. In the end pieces of the compartment 3 and partitions 12 and 13 are formed sight-holes 14 15 16 17, diminishing in area and diameter proportionately as to a cone of light conditioned at 14 by the object-aperture of one-half inch by one-quarter inch and at 17 by the eye-aperture of one sixty-fourth of an inch, thus giving a sight without a parallax.

On the bottom of the compartment 3, between the partitions 12 and 13, is suitably secured a small mirror-prism 18, arranged in such position that the half of the bubble in the spirit-level 8 is seen reflected in the prism in the center of the line of sight whenever the instrument is in a horizontal position. The rays from the bubble reach the prism through a slot 19 in the partition-wall between the compartments 2 and 3.

Across the aperture 14 are stretched three parallel wires or hairs 20 20' 20², the center one of which, 20', indicates horizontality when bisecting the reflected bubble in the prism-mirror. The upper and lower wires or hairs are placed at such distances from the center or middle wire that at a distance of one hundred feet from the wires the eye will observe one foot on any rod held perpendicular or at right angles to the line of sight. This expedient in the use of the reflected bubble in the prism with the line of sight and central wire converts the instrument into a perfect hand-level, while the addition of the stadia-wires allow the calculation and close approximation of distance.

The mirror-prism, positioned between the transverse partitions in the compartment 3, is protected by the bottom of the compartment and the sight-standards when turned down on the case.

21 22 designate the sight-standards, suitably hinged to the respective end walls of the compartment 3, which when turned down flat over the compartment close the same and lie coincidently and in alinement with the face of the top of the casing. The sight-standard 21 is an ordinary compass-sight standard, except as to its hinged connection, and is formed with a comparatively wide slot, having stretched therein a wire or hair 23 for a well-known purpose. The sight bar or standard 22 is formed with a fine slot 24 in its back plate and has secured to its inner face a mirror 25, on the back of which, in alinement and coincident with the slot in the standard, the silvering is removed at intervals and the surfaces of the glass at the exposed line at intervals blackened, as at 26, so as to provide a distinct broken line through the sight-slot and the mirror, permitting the sights to be readily made through the standard-slot and the mirror, one object or use being to use that line thus produced on the mirror in connection with the wire or hair 23 in the sight-slot of the standard 21 to take horizontal or vertical angles by the reflection with the accuracy obtained when three points appear in perfect alinement. To obtain perpendicular sights, which is sometimes necessary in work in mines, a wire 27 is stretched lengthwise in the apartment at the end of the compartment 3, between the partition 13 and the end wall of the compartment. This wire 27 lies on a plane in alinement with the wire 23 of the sight-standard and the slot and line on the back of the mirror.

The bottom of the compartment 3 is provided with narrow slots 28, so as to provide against the exclusion of light in some uses of the instrument and to afford protection to the wires from contact with the fingers while raising the sight-standards.

In the large compartment 2 of the casing, at or adjacent to one end thereof, is mounted the compass 29, on the face of which is indicated graduations 30 of the possible variations of the needle to the extent of twenty-five degrees in opposite directions from a true zero-line. After the variation has been ascertained and set off on the compass the graduated ring of the compass is secured in place by a screw provided with a stop. To set off the variation on the compass, release the screw $t$ and hold the instrument in both hands, the dial-face of the compass being on top. Then with the thumbs pressed lightly on the glass cover of the compass-box the variation-disk can be carried around on its axis to the left when Eastern variation is required and to the right when Western variation is indicated. A locking-lever is arranged under the bottom of the compass and prevents interference of the lever with the reading of the needle and permits the needle to be lifted and secured with the nearest accuracy in holding the needle true to its readings. When the needle is released, it drops squarely on the point of the pivot-pin.

In association with and adjunctive to the instrument, I provide a clinometer, designated by the reference 31, and provided with graduations 32. Secured to the back of the disk is a gravitating weight 32$^a$, which under ordinary conditions carries and holds the disks with the zero-line plumb. When taking vertical angles, the clinometer-disk is retained in place to which moved by a spring 33, having on its free end a shoe 34, which bears against the perimetral edge of the disk. A finger-stud 35, secured to the head of the spring and projecting through a slot 36 in the cover of the case, is used to draw the shoe 34 from contact with the edge of the disk. The records of the clinometer can be obtained by sighting either through the level sights, the open sights of the standards, or by applying the side of the casing to a slope or inclined surface.

In the bottom face of the case is formed a quadrant-shaped depression 37, in which is pivotally hung a vernier 38, the scale of which moves concentric with the graduated limb 39, secured in the floor of the depression. This appliance is used in connection with the case to ascertain the variations in the directions of altitudes.

Because the instrument is applicable to the ascertainment of inclinations, difference in direction from a meridian, measurement of distances and altitudes, and ascertainment of a true north line it becomes necessary that these several functions be briefly rehearsed and described.

The true north meridian having been ascertained or furnished, the compass is set on this line so that the north and south line of the compass-box coincides with this meridian and the limb of the compass-box is moved until the zero-line is exactly opposite the north end of the needle and the variation of the place is set off. The variation of the needle to the east or west of the meridian will indicate to the observer whether the variation is to the east or to the west. The instrument is now in condition for accurate surveying or reconnaissance work.

*Level, plumb, and square.*—It is readily perceived that by laying the instrument on its edge on a horizontal plane the horizontality is indicated by the bubble of the spirit-level located in the upper edge or side of the box and that by setting the side edge of the box against a vertical surface the position of the bubble in the spirit-level in the end of the box will show whether the object is plumb.

*Hand-level.*—If the case be placed with the sight edge down and the eye placed adjacent to the small peep-hole in the end of the box, the observer can distinguish the three wires lying across the aperture in the opposite end of the case. The middle one of these wires is placed in such position that when the box is level the reflected bubble will be shown bisected by the line simultaneously with the object in line of sight, and therefore the level be thus ascertained.

*Clinometer and vertical angles.*—To use the instrument as a clinometer, hold it vertical on its edge. Then look through the small eye-sight, paying no attention to the reflected bubble in the prism. Bisect the object with the center wire of the object-sight in the other end of the small compartment. When alinement is determined, release the clinometer and then permit the spring to return into contact and then read off the angle on the clinometer-disk. Should the incline or dip of a vein or ledge be desired, the instrument is placed on its side on the ledge or applied to a tightly-stretched wire or to a straight-edge laid on the ledge and then proceed in accordance with the directions above stated.

It may be that by reason of defective light or other causes a large field is desirable. In such instance the instrument is held flat with the sight-standards erect. Then sight through the slit in the shorter standard and bisect the wire of the longer sight with the object and release for a moment the clinometer-disk and read the recorded angle.

*Bearings and horizontal angles.*—It has been stated in the purview of the specification that the variation of the needle can be set off and the method of attaining this required information particularly specified. It is therefore evident that the bearings taken by the instrument must be true and correct. Hence to take horizontal angles, whether they be intended for bearing or otherwise, hold the instrument with the sight-standards erect, release the needle, aline the object by the sights. Then clamp the needle and read the record indicated. Only horizontal angles of some fifteen degrees below the level line, or about sixty-five degrees above can be taken in this way. In case a greater angle above the level line has to be determined hold the instrument level with the front sight erect. Move the reflecting-sight to incline outward until the eye comes directly above the sight and the image of the object is thrown on the mirror bisected by the wire of the object-sight and the line on the mirror and then read the bearing.

Sometimes in mine-surveying it is necessary to establish the location of a point at the bottom of a shaft or incline, which point is illuminated for visual observation. In such instance the case is held with the compass side up. Then the long sight-standard is closed and the short sight-standard turned down or lifted up until it assumes an acute angle with the plane of the case. Then by bending the head forward and downward the luminous point may be seen reflected in the mirror. Then move the instrument until the image is bisected by the wire in the slot in the small compartment and record the bearing. The wire attached lengthwise in the apartment of the compartment 3, in connection with the reflecting-sight, will admit of alining a point directly vertical below the operator.

*Stadia distances.*—To closely approximate distances, the instrument is held in the hands flat and same as for taking vertical angles. Then by sighting through the small peep-hole in the end of the casing the wires in the opposite end of the casing will be observed. These wires have been so placed and adjusted that on a rod divided into feet being placed at a point fifty feet from the instrument the space of two feet will be disclosed. At twenty-five feet a space of one foot, and at one hundred feet a space of four feet, will be visible on the rod.

In order that the operator may point off by stadia or other measurements, a scale of proper gradations is engraved on the side of the instrument, as shown in the drawings.

*The alidade.*—The instrument is adapted for laying off or platting an irregular piece of land, and this may be accomplished with but small error in the following-described manner: Preliminary to operating the following-named adjustments are provided: a square piece of board mounted on suitable supports and covered with drawing-paper and also any proper plumb-line and bob. After the table has been set over the starting-point level it with the instrument and then lay it flat on the table. Open the sights and operate the same as with any other alidade of a plane table. After recording the bearings take by stadia measurement the length of the line and point it off on the scale. Hence by means of the hand-level the depressions and elevations on the line can be ascertained and record made. By carefully repeating these operations the result will be a topographical plat.

*Gradienter.*—It is often necessary to lay off a chute or a ditch, and for this purpose the instrument is well adapted. As heretofore specified, the gradienter consists of a spirit-level rigidly fixed to an arm or rod which terminates in a vernier. The point where the vernier-rod is attached to the level serves as a pivot, so that the level can be brought into a position making any desired angle with the horizontal or with the vertical within the limits of the arc in which the vernier moves. Now knowing the grade which it is desired to lay out look at the table indicated on the side of the gradienter depression in the bottom of the case and take the corresponding angle to the ratio determined on. Set that angle off on the gradienter limit and clamp the arm in place. Now look through peep-hole and raise or lower the instrument until the central wire in the object end of the instrument bisects the depressed bubble. The point in the field, which will also be bisected by the line of sight, is one of the points on the line of grade sought for.

Having described my invention, what I claim is—

1. In a surveying and reconnaissance instrument, a compartment extending lengthwise of the instrument having end walls and intermediate transverse partitions, said end walls and partitions being provided with sight-apertures increasing in area from the eye-sight to the object-sight.

2. In a surveying and reconnaissance instrument, a compartment extending the length of the instrument having end walls and intermediate transverse partitions, said end walls and partitions being provided with sight-apertures increasing in area from the eye-sight to the object-sight, and wires across the object-aperture, adjusted to determine stadia measurements.

3. In a surveying and reconnaissance instrument, a compartment extending the length of the instrument having end walls and intermediate transverse partitions, said end walls and partitions being provided with sight-apertures increasing in area from the eye-sight to the object-sight, wires across the object-aperture adjusted to determine stadia measurements, and a spirit-level so arranged that the rays therefrom reflected will bisect the line of sight, and a prism-mirror to reflect the position of the bubble.

4. In a surveying and reconnaissance instrument, a compartment extending the length of the instrument, having end walls and intermediate transverse partitions, said end walls and partitions being provided with sight-apertures increasing in area from the eye-sight to the object-sight, wires across the object-aperture, sight-standards hinged to the end walls of the compartment having longitudinal slits therein, a mirror in the eye-sight standard having its backing removed in alinement with the slit in the sight, and a wire in the sight end of the compartment, substantially as and for the purposes specified.

5. In a surveying and reconnaissance instrument, a rectangular casing, a compass secured therein, an eye-sight standard, hinged to the casing, formed with a sight-slit, a mirror on the inside of the standard having the backing removed at determined distances in alinement with the sight-slit, an object-sight standard hinged to the other end of the casing and formed with a slot, and a wire stretched lengthwise in the slot.

6. In a surveying and reconnaissance instrument, a rectangular casing, a compartment in the casing, transverse partitions in the compartment, the end walls of the compartment and the partitions being provided with alining sight-apertures, a vernier pivotally mounted, and a spirit-level mounted to turn with the pivot of the vernier, whereby the level is brought into a position making any desired angle with the horizontal within the limits of the prescribed arc.

In testimony whereof I affix my signature in presence of two witnesses.

JOSEPH C. SALA.

Witnesses:
A. BARION,
P. H. SONNTAG.